United States Patent
Wang et al.

(10) Patent No.: US 9,217,891 B2
(45) Date of Patent: Dec. 22, 2015

(54) POLYMER DISPERSED LIQUID CRYSTAL PANEL AND LIQUID CRYSTAL DISPLAY DEVICE COMPRISING REACTION ACTIVE SITES UNIFORMLY DISTRIBUTED ON A SUBSTRATE AND MANUFACTURING METHOD THEREOF

(71) Applicant: BOE Technology Group Co., Ltd., Beijing (CN)

(72) Inventors: Xinxing Wang, Beijing (CN); Jaegeon You, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 68 days.

(21) Appl. No.: 14/026,053

(22) Filed: Sep. 13, 2013

(65) Prior Publication Data

US 2014/0078445 A1 Mar. 20, 2014

(30) Foreign Application Priority Data

Sep. 14, 2012 (CN) .......................... 2012 1 0343275

(51) Int. Cl.
*G02F 1/1333* (2006.01)
*G02F 1/1334* (2006.01)
*G02F 1/137* (2006.01)

(52) U.S. Cl.
CPC ............ *G02F 1/1334* (2013.01); *G02F 1/1333* (2013.01); *G02F 2001/13345* (2013.01); *G02F 2001/13775* (2013.01)

(58) Field of Classification Search
CPC ................ G02F 1/1334; G02F 1/1333; G02F 2001/13345; G02F 2001/13775

USPC ....................................................... 349/86–93
See application file for complete search history.

(56) References Cited

U.S. PATENT DOCUMENTS

| | | | | |
|---|---|---|---|---|
| 2002/0109807 | A1* | 8/2002 | Freeman .......................... | 349/92 |
| 2006/0209232 | A1* | 9/2006 | Komitov et al. ................. | 349/88 |
| 2011/0304799 | A1* | 12/2011 | Lee et al. .......................... | 349/86 |
| 2012/0169971 | A1* | 7/2012 | Hwang et al. ................... | 349/86 |

FOREIGN PATENT DOCUMENTS

CN 102618298 A 8/2012

OTHER PUBLICATIONS

First Office Action issued by State Intellectual Property Office of the People's Republic of China for Chinese Patent Application No. 201210343275.6 dated Jul. 3, 2014, 5pgs.
English translation of First Office Action issued by State Intellectual Property Office of the People's Republic of China for Chinese Patent Application No. 201210343275.6 dated Jul. 3, 2014, 2pgs.

* cited by examiner

*Primary Examiner* — Paul Lee
(74) *Attorney, Agent, or Firm* — Ladas & Parry LLP

(57) ABSTRACT

Embodiments of the invention disclose a liquid crystal panel and a manufacturing method thereof, and a liquid crystal display device. The liquid crystal panel comprises two substrates disposed to be cell-aligned, reaction active sites for polymerization reaction are evenly formed on surfaces of the two substrates in opposition to each other, and a polymer dispersed liquid crystal layer is disposed between the two substrates. At least a part of polymer contained in the polymer dispersed liquid crystal layer is bonded to the reaction active sites.

16 Claims, 2 Drawing Sheets

POLYMER DISPERSED LIQUID CRYSTAL PANEL AND LIQUID CRYSTAL DISPLAY DEVICE COMPRISING REACTION ACTIVE SITES UNIFORMLY DISTRIBUTED ON A SUBSTRATE AND MANUFACTURING METHOD THEREOF

CROSS REFERENCE TO RELATED APPLICATIONS

This application claims priority from Chinese National Application No. 201210343275.6 filed on Sep. 14, 2012, the contents of which are incorporated herein by reference.

BACKGROUND

Embodiments of the present invention relate to a liquid crystal panel and a manufacturing method thereof, a liquid crystal display device.

A PDLC (polymer dispersed liquid crystal) film is a liquid crystal functional film with excellent performance that is formed by means of dispersing liquid crystals in an organic solid polymer matrix in the form of small droplets in micron scale, and has characteristics of an electrically controlled optical switch under the control of an electric field. Relative to a conventional display device, a liquid crystal display device of a polymer dispersed mode has such merits that it does not need a polarizer and an alignment layer, has a simple manufacturing process, is more easy to be produced into a large-area flexible display, and so on, and has been widely used in the fields of optical modulator, electrically controlled glass, light valve, projection display, electronic book, etc. at present.

When no voltage is applied across the PDLC, an optical axis of each small droplet that is dispersed in the polymer is preferentially oriented according to the lowest energy principle, and thus optical axes of droplets are in the state of a disordered orientation. Because the liquid crystal is a material having strong optical and dielectric anisotropies, and its effective refractivity does not match (or has a larger difference) with the refractivity of a polymer matrix, rays that are incident onto the PDLC may be intensively scattered so as to make the PDLC be shown in an opaque or translucent milky white; when an external electric field is applied across the PDLC, directions of optical axes of liquid crystal droplets are unified to be along the direction of the electric field, the refractivity of the liquid crystal droplets and the refractivity of the polymer achieve a certain degree of match, so that the rays can pass through the matrix, thus PDLC film appears to be transparent or translucent. As such, the PDLC can be used to realize an electrically controlled optical switch by whether or not a voltage is applied to the PDLC.

Currently, the PDLC is manufactured mainly in such a way that a homogeneous system of a polymer and a LC mixture is subjected to phase separation to thereby form dispersed LC droplets in a continuous phase of the polymer. FIG. 1 is a schematic view illustrating the distribution of matter at a certain moment during ultraviolet solidification of a PDLC in prior art, and FIG. 2 is a schematic view illustrating the transmittance of liquid crystal droplets following the ultraviolet solidification of the PDLC as shown in FIG. 1. As shown in FIG. 1 and FIG. 2, in a conventional solidification process of the PDLC, between substrates 71 and 72, the molecular chain of a polymer that is produced by disordered polymerization of polymer 8 tends to wrap on liquid crystal droplets 9, so that the separation between a liquid crystal phase and a polymer phase is difficult. As such, after the PDLC is solidified, the liquid crystal droplets 9 are formed in non-uniform size and distribution, and liquid crystal droplets 9 are oriented differently so that the mutual matching degree between their optical axes is low, thereby leading to a poor transmittance of PDLC to lights L. Moreover, lights on the condition of a wide viewing angle is seriously scattered as well because the matching degree between optical axes of the liquid crystal droplets is too low.

Generally, the dispersion of a liquid crystal phase in a polymer can be improved by means of adding a surfactant into a mixture of liquid crystals and the polymer, etc., so that a PDLC with a wide viewing angle and a high light transmittance is formed after the mixture is solidified and subjected to phase separation. However, the surfactant usually has a small molecular texture, and also has a problem of compatibility with each of polymer and liquid crystal droplets that have larger molecules. Therefore, its effect on improvement of the dispersion is not ideal.

SUMMARY

An object of the invention is to provide a liquid crystal panel and a manufacturing method thereof, a liquid crystal display device, with which, liquid crystal droplets of a PDLC can be made to be more uniform and orderly, thereby effectively improving wide-viewing-angle display effect and optical transmittance of the liquid crystal panel.

According to an embodiment of the invention, there is provided a liquid crystal panel, comprising: two substrates disposed opposing each other, at least one substrate of the two substrates including reaction active sites for polymerization reaction on its surface facing the other substrate; and a polymer dispersed liquid crystal layer disposed between the two substrates, wherein at least a part of polymer contained in the polymer dispersed liquid crystal layer is bonded to the reaction active sites.

In one example, the reaction active sites are formed on both surfaces that face each other of the two substrates.

In one example, the substrates are formed of organic glass.

In one example, the polymer in the polymer dispersed liquid crystal layer comprises methacrylates polymer, acrylates polymer or epoxy resin polymer.

In one example, the reaction active sites are substrate surface defects formed by processing the surface of the substrate.

In one example, a size of each of the reaction active sites is in a range from 1 micron to 10 microns.

In one example, the reaction active sites are uniformly distributed on the substrate.

Another embodiment of the invention provides a manufacturing method of a liquid crystal panel, comprising: forming reaction active sites for polymerization reaction on a surface of one substrate of two substrates; cell-assembling the two substrates, so that the surface of the substrate with the reaction active sites faces the other substrate, and a mixture of prepolymer and liquid crystals is filled between the two substrates; solidifying the prepolymer so as to form a polymer dispersed liquid crystal layer between the two substrates, wherein at least a part of polymer contained in the polymer dispersed liquid crystal layer is bonded to the reaction active sites.

In one example, the method further comprises forming reaction active sites on a surface of the other substrate of the two substrates, wherein the surfaces of the two substrates with the reaction active sites face each other.

In one example, the step of forming reaction active sites comprises: forming substrate surface defects by processing the surface of the substrate.

In one example, the step of forming the substrate surface defects by processing the surface of the substrate comprises: dashing a thermal needle against the surface of the substrate to form the substrate surface defects.

In one example, a temperature of the thermal needle is in the range of 200 degrees Celsius to 300 degrees Celsius upon the surface being processed.

In one example, a temperature of the thermal needle is 250 degrees Celsius upon the surface being processed.

In one example, the step of forming the substrate surface defects by processing the surface of the substrate comprises: irradiating the surface of the substrate with ultraviolet light or infrared light to form the substrate surface defects.

In one example, the step of forming the substrate surface defects by processing the surface of the substrate comprises: corroding the surface of the substrate with a chemical etchant to form the substrate surface defects.

Still another embodiment of the invention provides a liquid crystal display device, comprising the liquid crystal panel according to any embodiment of the invention.

As regards the liquid crystal panel and the manufacturing method thereof and liquid crystal display device provided by embodiments of the invention, reaction active sites for polymerization reaction are uniformly formed on surfaces of two substrates, which face each other, so that when prepolymer of polymer are polymerized, one end of the molecular chain of polymer formed by it can be bonded to the reaction active sites on one of the substrates. Thus, the molecular chain of the polymer stretches to a certain degree, and can be cross-linked to or tangled with the molecular chain of a polymer bonded to the substrate on the opposite side so as to form a network of polymer. In such a way, in the course of forming polymer, molecular chains of polymer are subject to a stretching effect, that is, the formation process of the network of polymer is directional and orderly, so that the formed network configuration of polymer is more uniform as well, and thereby, liquid crystal droplets restricted in the network of polymer are also more uniform and orderly. As such, when a voltage is applied on the liquid crystal panel, transmission and scattering of lights at each angle are more uniform, and the light intensity at a wider viewing angle is also increased, thus effectively improving the optical transmittance and wide-viewing-angle display effect of the liquid crystal panel.

BRIEF DESCRIPTION OF THE DRAWINGS

In order to illustrate the technical solution of the embodiments of the invention more clearly, the drawings of the embodiments will be briefly described below; it is obvious that the drawings as described below are only related to some embodiments of the invention, but not limitative of the invention.

DETAILED DESCRIPTION

In order to make objects, technical details and advantages of the embodiments of the invention apparent, hereinafter, the technical solutions of the embodiments of the invention will be described in a clearly and completely way in connection with the drawings related to the embodiments of the invention. It is obvious that the described embodiments are just a part but not all of the embodiments of the invention. Based on the described embodiments of the invention, those ordinarily skilled in the art can obtain other embodiment(s), without any inventive work, which belong(s) to the scope sought for protection by the invention.

Figure 1:
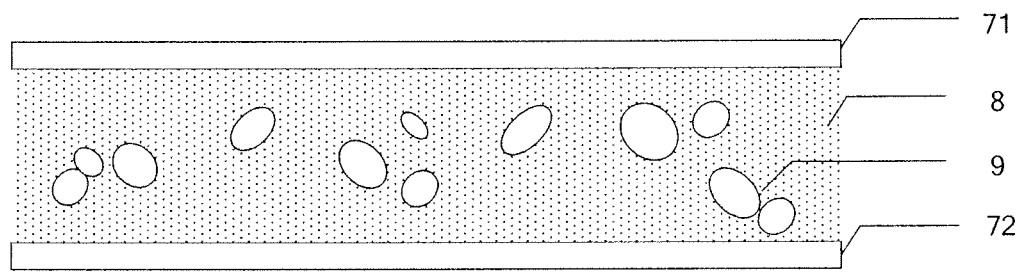
FIG. 1 is a schematic view illustrating the distribution of matter at a certain moment during ultraviolet solidification of a PDLC in prior art.
Figure 2:
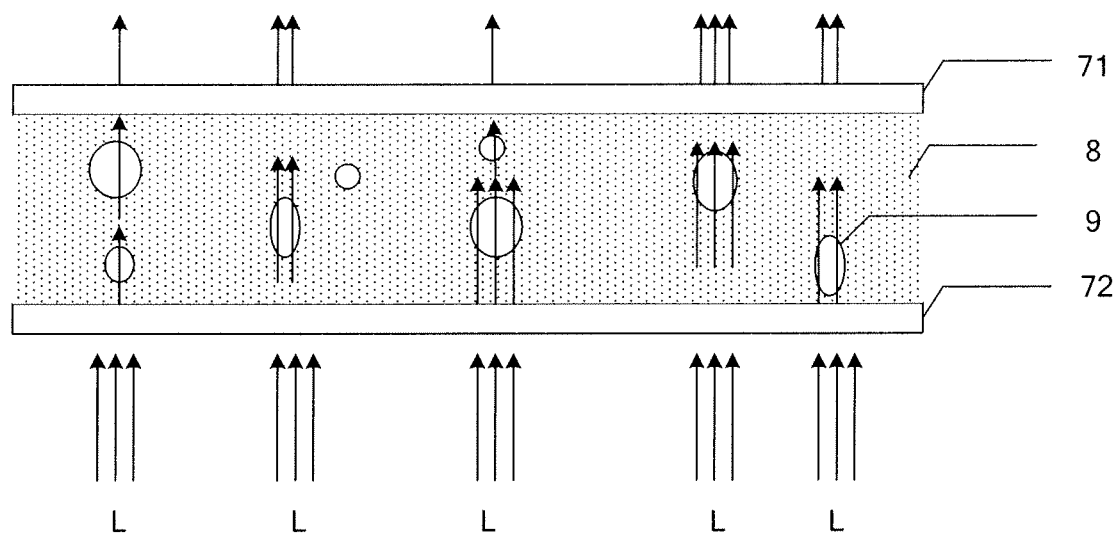
FIG. 2 is a schematic view illustrating the transmittance of liquid crystal droplets following the ultraviolet solidification of the PDLC as shown in FIG. 1.
Figure 3:
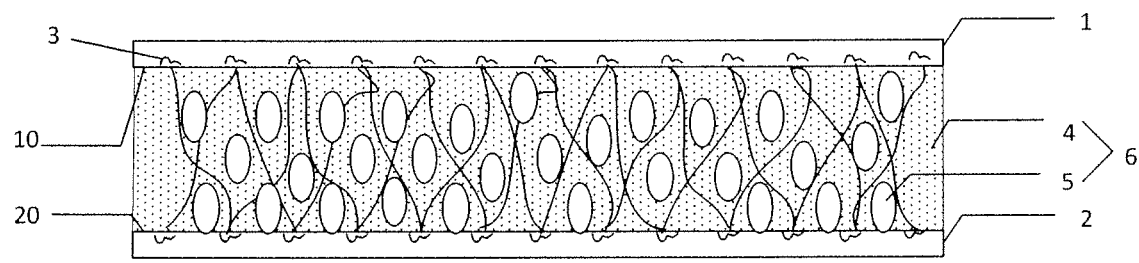
FIG. 3 is a structurally schematic view illustrating a liquid crystal panel provided by an embodiment of the invention.

As shown in FIG. 3, an embodiment of the invention provides a liquid crystal panel which comprises two substrates 1 and 2 disposed to be cell-assembled. Reaction active sites 3 for polymerization reaction are uniformly formed on surfaces 10 and 20 of the two substrates 1 and 2, which face each other, and a polymer dispersed liquid crystal layer 6 which comprises polymer 4 and liquid crystals droplets 5 dispersed in the polymer 4 is formed between the two substrates 1 and 2. At least a part of the polymer 4 contained in the polymer dispersed liquid crystal layer 6 is bonded to the reaction active sites 3.

In the liquid crystal panel provided by the embodiment of the invention, reaction active sites 3 for polymerization reaction are uniformly formed on surfaces 10 and 20 of the two substrates 1 and 2, which face each other. So, when prepolymer of polymer are polymerized, one end of the formed molecular chain of polymer 4 can be bonded to the reaction active sites 3 on the substrate 1, so that the molecular chain of the polymer 4 stretches to a certain degree, and can be cross-linked to or tangled with the molecular chain of polymer 4 bonded to the substrate 2 on the opposite side so as to form a network of polymer 4. In such a way, in the course of forming the network of polymer 4, molecular chains of polymer 4 come under a drawing action, that is, the formation process of the network of the polymer is directional and orderly, so that the formed network configuration of the polymer 4 is more uniform, and liquid crystal droplets 5 restricted in the network of polymer 4 are also more uniform and orderly. As such, when a voltage is applied on the liquid crystal panel, transmission and scattering of lights at each angle are more uniform, and the light intensity at a wider viewing angle is also increased, thus effectively improving the optical transmittance and wide-viewing-angle display effect of the liquid crystal panel.

To be explained, for illustrative convenience, only one or two molecular chains of polymer 4 bonded to each of the reaction active sites 3 are exemplarily illustrated in FIG. 3, but the present invention is not limited thereto. Rather, more molecular chains of polymer 4 may be bonded at each of the reaction active sites 3, and the same molecular chain of polymer 4 may be bonded only to reaction active sites 3 on one of the substrates 1 and 2, or may also be bonded to reaction active sites 3 on these two substrates 1 and 2 simultaneously. The formed, multiple molecular chains of polymer 4 that are drawn are cross-linked to or tangled with each other so as to form the network of polymer 4.

Figure 4:
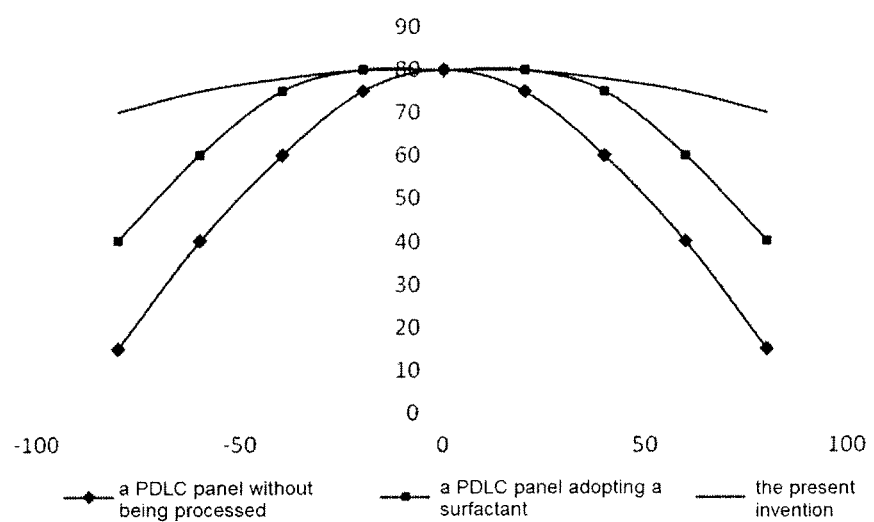
FIG. 4 is a comparative view showing viewing angles for a liquid crystal panel provided by an embodiment of the invention and liquid crystal panels in the related art.

FIG. 4 is a comparative view showing viewing angles for a liquid crystal panel provided by an embodiment of the invention and liquid crystal panels in the related art, where, the transverse axis represents optical transmittance of a liquid crystal panel, and the vertical axis represents viewing angle of the liquid crystal panel. As shown in FIG. 4, effective viewing angle of a liquid crystal panel without any treatment is only within 20 degrees; effective viewing angle of a liquid crystal panel, for which, the dispersion of liquid crystal droplets in a polymer is improved by using a method of adding a surfactant in the related art, is within 40 degrees, while effective viewing angle of the liquid crystal panel provided by the present invention is within 70 degrees. The effective angle is defined as a viewing angle scope in which optical transmittance is more than 65%. As can be seen, wide-viewing-angle display effect of the liquid crystal panel provided by the invention is improved remarkably.

For example, the reaction active sites 3 may be substrate surface defects formed by processing the facing surfaces 10 and 20 of the two substrates 1 and 2. At the substrate surface defects, some molecules whose chemical bonds are broken are present on the surfaces 10 and 20 of the substrates, and they have a high reactivity and can be polymerized comparatively easily. When prepolymer of the polymer 4 are subjected to a polymerization reaction between the substrates 1 and 2, these molecules will also have a polymerization reaction with the prepolymer. Thus, one end of the formed molecular chain of polymer 4 is bonded to the substrate 1 or the substrate 2, so that the formed molecular chain of polymer 4 is drawn to achieve a certain stretch.

Optionally, the reaction active sites 3 may be formed by a variety of method. For example, in an embodiment of the invention, the reaction active sites 3 may be substrate surface defects formed by means of dashing thermal needles against the facing surfaces 10 and 20 of the two substrates 1 and 2. Upon the surface being processed, the temperature of the thermal needles may be in the range of 200 degrees Celsius to 300 degrees Celsius, such as 250 degrees Celsius.

In another embodiment of the invention, the reaction active sites 3 may also be substrate surface defects formed by irradiating the facing surfaces 10 and 20 of the two substrates 1 and 2 with ultraviolet light or infrared light. Or, the reaction active sites 3 may also be substrate surface defects formed by corroding the facing surfaces 10 and 20 of the two substrates 1 and 2 with a chemical etchant.

The reaction active sites 3 in the above embodiments are each substrate surface defects formed by processing the surfaces 10 and 20 of the two substrates 1 and 2, but the invention is not limited thereto. In other embodiments of the invention, the reaction active sites 3 may be sites having polymerization reactivity in other forms as well, as long as these sites having polymerization reactivity can promote formation of molecular chains of polymer and anchor the ends of the formed molecular chains so as to carry out a stretching effect on the formed network of polymer.

To be explained, the substrate surface defects formed by the above methods should be distributed on the facing surfaces 10 and 20 of the substrate in a relatively uniform way, and in this way, the polymer network formed after prepolymer of polymer are bonded to the reaction active sites at the substrate surface defects during its polymerization is more uniform as well. Thereby, size and distribution of liquid crystal droplets restricted by the polymer network are more uniform, and further, the optical transmittance and the wide-viewing-angle display effect of the liquid crystal panel is improved. For example, in an embodiment of the invention, the specific distribution of reaction active sites is that, in each of pixel units of the liquid crystal panel, there is at least one corresponding reaction active site 3. Alternatively, size and distribution of substrate surface defects can be controlled by controlling size of tips of the thermal needles and needle pitch, by controlling diameter of rays of the ultraviolet light or infrared light, or by controlling injection location of the chemical etchant on a substrate with an injector.

Optionally, the shape of the reaction active sites 3 may be a circular shape, a square shape, a polygonal shape or other irregular shape, as long as the reaction active sites 3 can promote formation of molecular chains of polymer in the polymer dispersed liquid crystal layer and anchor the ends of the formed molecular chains so as to make the formed molecular chains of polymer more uniform and orderly, and the present invention does not set a limit to it. For example, the range of size of reaction active sites 3 may be 1 micron to 10 microns, and as the reaction active sites 3 may be in an irregular shape, the size here specifically refers to the diameter of a circumcircle of each of the reaction active sites 3.

Optionally, the substrates 1 and 2 may be transparent conductive substrates, for example, they may be organic glass doped or coated with indium tin oxide. And polymer 4 of polymer dispersed liquid crystal layer may be methacrylates polymer, acrylates polymer, epoxy resin polymer, or the like. Because the main component of organic glass is polymethylmethacrylate (PMMA), and from the point of difficulty level of polymerization reaction, reaction active sites 3 on organic glass more easily creates a reaction with methylacrylates prepolymer or acrylates prepolymer, the polymer 4 are preferably of methylacrylates polymer or acrylates polymer. Other selectable types are other polymer matrix which can be applied to the PDLC field, and are also included therein in the premise that special effects are considered. To be explained, the material of the substrate is not limited to organic glass, any material is possible as long as reaction active sites that are formed after the surface of such a material is subjected to treatment can create a polymerization reaction with prepolymer.

Accordingly, embodiments of the invention further provide a manufacturing method of a liquid crystal panel, comprising:

S11, forming reaction active sites for polymerization reaction uniformly on surfaces of two substrates, respectively;

S12, cell-assembling the two substrates (e.g., bonding the two substrates at the edges thereof by using sealant so that the two substrates oppose each other with a gap therebetween for filling liquid crystal), during the cell assembly processes, the surfaces of the two substrates with the reaction active sites formed are made to face each other, and a mixture of prepolymer and liquid crystals is filled between the two substrates;

S13, solidifying the prepolymer so as to form a polymer dispersed liquid crystal layer in the liquid crystal cell, wherein at least a part of polymer contained in the polymer dispersed liquid crystal layer is bonded to the reaction active sites.

As regards the manufacturing method of the liquid crystal panel provided by the embodiment of the invention, reaction active sites for polymerization reaction are uniformly formed on surfaces of the two substrates, which face each other, so that when prepolymer of polymer are polymerized, one end of the formed molecular chain of polymer can be bonded to the reaction active sites on one of the substrates. Thus, the molecular chain of the polymer stretches to a certain degree, and can be cross-linked to or tangled with the molecular chain of polymer bonded to the substrate on the opposite side so as to form a network of polymer. In such a way, in the course of forming polymer, molecular chains of polymer come under a drawing action, that is, the formation process of the network of polymer is directional and orderly, so that the formed network configuration of polymer is more uniform as well, and thereby, liquid crystal droplets 5 restricted in the network of polymer are also more uniform and orderly. As such, when a voltage is applied across the liquid crystal panel, transmission and scattering of lights at each angle are more uniform, and the light intensity at a wider viewing angle is also increased, thus effectively improving the optical transmittance and wide-viewing-angle display effect of the liquid crystal panel.

For example, the step of forming reaction active sites for polymerization reaction uniformly on surfaces of two substrates, respectively in the step S11 may include forming substrate surface defects uniformly on the surfaces of the two substrates by processing the surfaces of the two substrates.

For example, optionally, in an embodiment of the invention, the substrate surface defects may be formed uniformly on the surfaces by means of dashing thermal needles against the surfaces of the two substrates. Upon the surface being processed, the temperature of the thermal needles may be in the range of 200 degrees Celsius to 300 degrees Celsius, such as 250 degrees Celsius.

Optionally, in another embodiment of the invention, the substrate surface defects may also be formed uniformly on the surfaces by means of irradiating the surfaces of the substrates with ultraviolet light or infrared light, or, the substrate surface defects may also be formed uniformly on the surfaces by means of corroding the surfaces of the two substrates with a chemical etchant, etc.

Optionally, in the step S12, it is possible that the two substrates are firstly disposed to be cell-assembled to form a liquid crystal cell, so that surfaces of the substrates with the reaction active sites formed face each other, and then prepolymer and liquid crystals are mixed uniformly and injected into the liquid crystal cell; it may also be possible that at first, a homogeneous mixture of prepolymer and liquid crystals is dropped on a surface of one of the substrates with the reaction active sites, and after that, the two substrates are cell-assembled. Preferably, an initiator may further be introduced into the homogeneous mixture of prepolymer and liquid crystals. When S13 is the optical solidification, the employed initiator is an optical initiator; and when the S13 is the thermal solidification, the employed initiator is a thermal initiator.

In correspondence with the foregoing liquid crystal panel, embodiments of the invention further provides a liquid crystal display device, which comprises the liquid crystal panel in the foregoing embodiment, and thus the beneficial technical effects achievable by the liquid crystal panel can also be realized by it. A detailed description has been made in the preceding sections, and details are omitted here.

The liquid crystal panel and the manufacturing method thereof in which the reaction active sites are formed on both of the cell-assembled substrates are described as an example. However, the embodiments of the invention are not limited thereto, and it is possible that only one of the two substrates is formed with the reaction active sites. In the case that the reaction active sites are formed uniformly on one substrate, the polymer network can also be made more uniform. In addition, the above embodiments in which the reaction active sites formed on the substrate is uniformly distributed are described as an example. However, it should be noted that the reaction active sites can also be distributed nonuniformly. Uniformly distributed reaction active sites can make the polymer network more uniform, and the liquid crystals can be aligned more orderly.

The forgoing are merely exemplarily embodiments of the invention, but are not used to limit the protection scope of the invention. The protection scope of the invention is determined by attached claims.

What is claimed is:

1. A liquid crystal panel, comprising: two substrates disposed opposing each other, at least one substrate of the two substrates including reaction active sites for polymerization reaction on its surface facing the other substrate; and a polymer dispersed liquid crystal layer disposed between the two substrates, wherein at least a part of polymer contained in the polymer dispersed liquid crystal layer is bonded to the reaction active sites, and wherein the reaction active sites are uniformly distributed on the substrate.

2. The liquid crystal panel according to claim 1, wherein the reaction active sites are formed on both surfaces that face each other of the two substrates.

3. The liquid crystal panel according to claim 1, wherein the substrates are formed of organic glass.

4. The liquid crystal panel according to claim 1, wherein the polymer in the polymer dispersed liquid crystal layer comprises methacrylates polymer, acrylates polymer or epoxy resin polymer.

5. The liquid crystal panel according to claim 2, wherein the polymer in the polymer dispersed liquid crystal layer comprises methacrylates polymer, acrylates polymer or epoxy resin polymer.

6. The liquid crystal panel according to claim 1, wherein the reaction active sites are substrate surface defects formed by processing the surface of the substrate.

7. The liquid crystal panel according to claim 1, wherein a size of each of the reaction active sites is in a range from 1 micron to 10 microns.

8. A manufacturing method of a liquid crystal panel, comprising: forming reaction active sites for polymerization reaction on a surface of one substrate of two substrates, the reaction active sites being uniformly distributed on the substrate; cell-assembling the two substrates, so that the surface of the substrate with the reaction active sites faces the other substrate, and a mixture of prepolymer and liquid crystals is filled between the two substrates; solidifying the prepolymer so as to form a polymer dispersed liquid crystal layer between the two substrates, wherein at least a part of polymer contained in the polymer dispersed liquid crystal layer is bonded to the reaction active sites.

9. The method according to claim 8, further comprising: forming reaction active sites on a surface of the other substrate of the two substrates, wherein the surfaces of the two substrates with the reaction active sites face each other.

10. The method according to claim 8, wherein the step of forming reaction active sites comprises: forming substrate surface defects by processing the surface of the substrate.

11. The method according to claim 10, wherein the step of forming the substrate surface defects by processing the surface of the substrate comprises: dashing a thermal needle against the surface of the substrate to form the substrate surface defects.

12. The method according to claim 11, wherein a temperature of the thermal needle is in the range of 200 degrees Celsius to 300 degrees Celsius upon the surface being processed.

13. The method according to claim 12, wherein a temperature of the thermal needle is 250 degrees Celsius upon the surface being processed.

14. The method according to claim 10, wherein the step of forming the substrate surface defects by processing the surface of the substrate comprises: irradiating the surface of the substrate with ultraviolet light or infrared light to form the substrate surface defects.

15. The method according to claim 8, wherein the step of forming the substrate surface defects by processing the surface of the substrate comprises: corroding the surface of the substrate with a chemical etchant to form the substrate surface defects.

16. A liquid crystal display device, comprising the liquid crystal panel according to claim 1.

* * * * *